(12) United States Patent
Subedi

(10) Patent No.: US 11,604,813 B2
(45) Date of Patent: Mar. 14, 2023

(54) METHOD FOR CLASSIFYING AND GROUPING USERS BASED ON USER ACTIVITIES

(71) Applicant: Clari Inc., Sunnyvale, CA (US)

(72) Inventor: Mahesh Subedi, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 220 days.

(21) Appl. No.: 17/170,075

(22) Filed: Feb. 8, 2021

(65) Prior Publication Data

US 2021/0165809 A1 Jun. 3, 2021

Related U.S. Application Data

(63) Continuation of application No. 16/163,519, filed on Oct. 17, 2018, now Pat. No. 10,956,455.

(51) Int. Cl.
*G06F 16/28* (2019.01)
*G06F 16/9535* (2019.01)
*G06F 16/2457* (2019.01)
*G06F 9/54* (2006.01)
*G06F 9/48* (2006.01)

(52) U.S. Cl.
CPC .......... *G06F 16/285* (2019.01); *G06F 9/4887* (2013.01); *G06F 9/547* (2013.01); *G06F 16/24578* (2019.01); *G06F 16/9535* (2019.01)

(58) Field of Classification Search
CPC ............... G06F 16/285; G06F 16/9535; G06F 16/24578; G06F 9/4887; G06F 9/547
See application file for complete search history.

(56) References Cited

U.S. PATENT DOCUMENTS

| 10,977,258 B1 | 4/2021 | Liu et al. |
|---|---|---|
| 2007/0266321 A1 | 11/2007 | Bicker et al. |
| 2008/0034354 A1 | 2/2008 | Brughton et al. |
| 2008/0270761 A1 | 10/2008 | Rasmussen et al. |
| 2012/0221596 A1* | 8/2012 | Hall ............ G06F 16/972 707/769 |
| 2013/0007139 A1 | 1/2013 | Bombacino et al. |
| 2014/0201126 A1 | 7/2014 | Zadeh et al. |
| 2015/0263925 A1* | 9/2015 | Shivashankar ....... H04L 67/535 709/224 |

(Continued)

FOREIGN PATENT DOCUMENTS

EP 2973380 A2 1/2016

*Primary Examiner* — Hosain T Alam
*Assistant Examiner* — Anthony G Gemignani
(74) *Attorney, Agent, or Firm* — Womble Bond Dickinson (US) LLP

(57) ABSTRACT

According to some embodiments, described herein is a system and method for classifying and grouping users of a task database system based on their activities in completing tasks defined in the task database system. A cloud server communicatively coupled to the task database system receives task data from the task database system, receives a request for ranking users under a particular level in a user hierarchy, gathers user activity data from an activity data server, uses a predetermined algorithm calculate a raw score for each user based on the user's activity, normalizes the raw score, and generates a ranking of the users based on their normalized scores. The ranking can be used as an indicator for determining which users need additional training in communicating with outside parties in completing assigned tasks.

25 Claims, 11 Drawing Sheets

(56) References Cited

U.S. PATENT DOCUMENTS

| | | |
|---|---|---|
| 2016/0337300 A1 | 11/2016 | Ossia et al. |
| 2017/0083179 A1 | 3/2017 | Gruber et al. |
| 2017/0171124 A1 | 6/2017 | Brezina et al. |
| 2018/0026923 A1 | 1/2018 | Cho et al. |
| 2018/0101537 A1* | 4/2018 | Govindarajan ... G06F 16/24578 |
| 2018/0276041 A1 | 9/2018 | Bansal et al. |

* cited by examiner

600

A: Number of emails sent in the last 4 weeks
B: Number of email received in the last 4 weeks
C: Number of emails sent in the last 3 months
D: Number of emails received in the last 3 months

613

E: Number of meetings in the last 4 weeks
F: Number of meeting in the last quarter
G: Number of upcoming meetings

617 a: Weight of number of emails sent in the last 4 weeks
b: Weight of number of emails received in the last 4 weeks
c: Weight of number of emails sent in the last 3 months
d: Weight of number of emails received in the last 3 months

615 e: Weight of number of meetings in the last 4 weeks
f: Weight of number of meetings in the last quarter
g: Weight of number upcoming meetings

619

Raw Score $R = A*a + B*b + C*c + D*d + E*e + F*f + G*g$

METHOD FOR CLASSIFYING AND GROUPING USERS BASED ON USER ACTIVITIES

RELATED APPLICATIONS

This is a continuation application of U.S. patent application Ser. No. 16/163,519, filed Oct. 17, 2018, which is incorporated by reference in its entirety.

FIELD OF THE INVENTION

Embodiments of the present invention relate generally to cloud servers and data processing systems. More particularly, embodiments of the invention relate to methods and systems for providing a cloud server for use in classifying and grouping users based on their activities.

BACKGROUND

In organizations that use a task database system, it is important for system administrators to have sufficient information and visibility of activities of users of the task database system, as the activities may be an important driving factor for progress in completing certain tasks defined in the task database systems.

For example, users of the task database systems often need to communicate with outside contacts/parties in completing tasks defined in the task database systems. The communication can be an important indicator of user engagement with the outside parties, and as such, can provide useful information for system administrators to identify users that need further training and coaching in completing their assigned tasks.

BRIEF DESCRIPTION OF THE DRAWINGS

Embodiments of the invention are illustrated by way of example and not limited to the figures of the accompanying drawings in which like references indicate similar elements.

FIG. 6 illustrates an example of computing raw score for a particular task in accordance with an embodiment of the invention.

DETAILED DESCRIPTION

Figure 1:
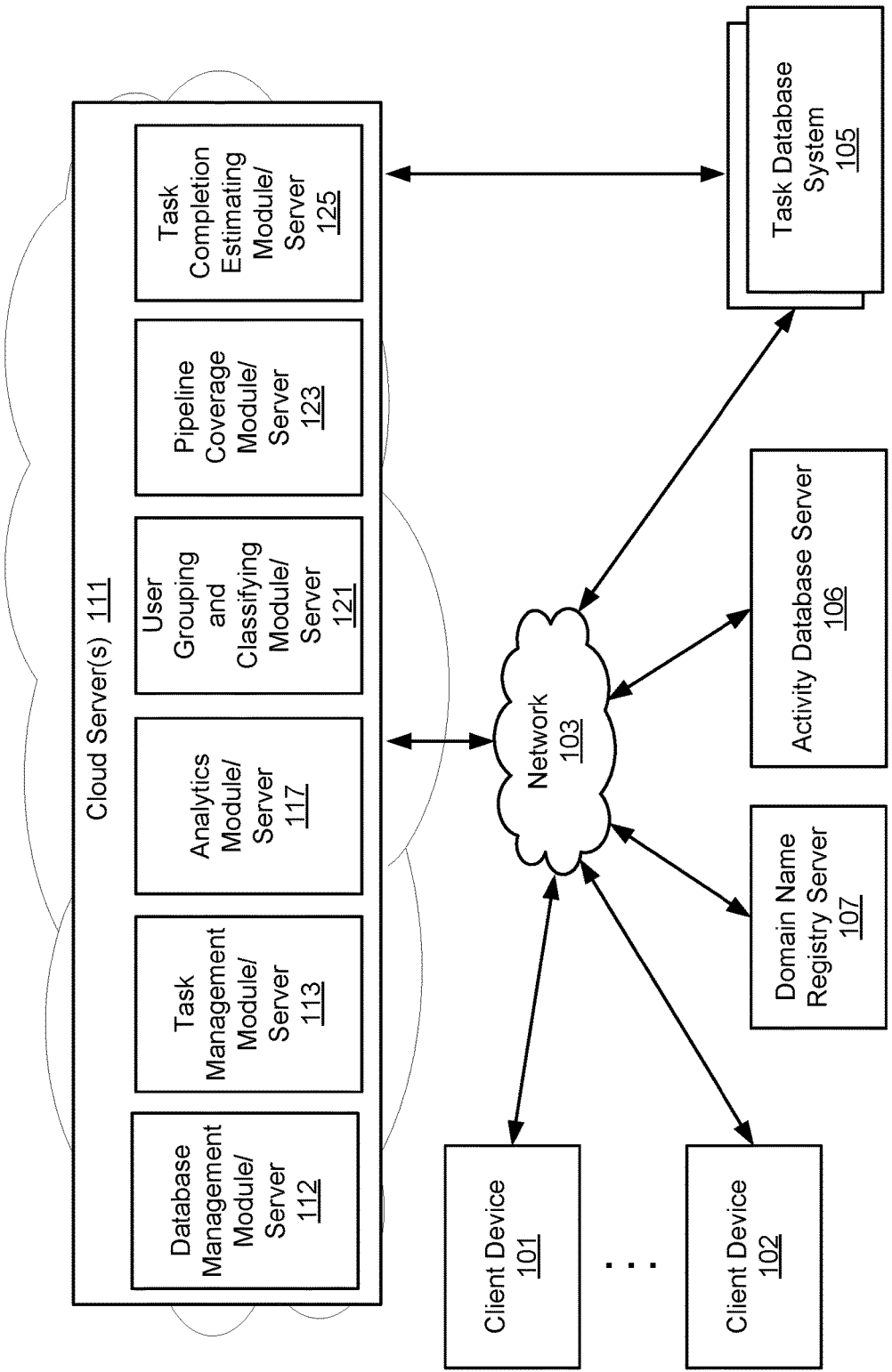
FIG. 1 is a block diagram illustrating a network configuration according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, described herein is a system and method for classifying and grouping users of a task database system based on their activities in completing tasks defined in the task database system. A cloud server communicatively coupled to the task database system can receive task data from the task database system, and can automatically gather user activity data from an activity data server. Based on the task data from the task database system and the user activity data from the activity data server, the cloud server can identify risks, deliver predictive insights, and assess performance of users of the task database system by grouping, classifying and/or ranking the users.

In an embodiment, the method can be implemented by a cloud server having a memory and a processor over a network, and can include the operation of receiving, at the cloud server, a request for ranking users of the task database system, where the users are under a particular level in a pre-defined user hierarchy. The method further includes the operation of retrieving, via a first application programming interface (API) using a database query protocol, a plurality of tasks from the task database system, where each task is associated with the particular level in the pre-defined user hierarchy and is targeted to complete in a predetermined time frame. Each task is represented by a task data object storing all of the metadata and/or attributes of the corresponding task. For each task, the cloud server identifies a user and a target date of completion associated with the task, either from the task itself or from the task database system via the first API; and uses the first API to retrieve data associated with the user and the target date of completion from the task database system. A user may be presented by a user object storing the metadata and/or attributes associated with the user. The method further includes the operation of retrieving, by the cloud server via a second API using a mail protocol, activity data of the user associated with each of the plurality of tasks from an activity data server.

In one embodiment, the activity data includes email communication and meetings between the user and one or more target contacts for the task. The method further includes the operation of computing a raw score for the task based on the activity data representing user activities of the user (e.g., the corresponding user object), computing a total score for the user by summing up raw scores of one or more tasks associated with the user, normalizing the total raw score for the user using a predetermined normalization algorithm, ranking the user based on the normalized total raw score in view of total raw scores of other users under the particular level in the user hierarchy, and transmitting the ranking of the user to a remote device over the network to be displayed in a graphical user interface of the remote device.

comm.

In an embodiment, the user grouping and classifying module can invoke an application programming interface (API) to retrieve from the task database system tasks associated with the particular level in the user hierarchy and that are targeted to complete in a predetermined time frame, e.g., in a current and one or more next quarters. For each task, the user grouping and classification module can identify contacts associated with the task, and a target date to complete for the task. Based on the contacts and their email domains, the user grouping and classifying module can identify email interactions as well as past meetings and upcoming meetings between the user and one or more target contacts. Based on the emails and meetings and their times, a raw score can be computed for each user, and can be normalized to be in the range of 0 to 100 to account for differences in user activities caused by different sales activities in different organization units.

In an embodiment, the users under a particular hierarchy level in the user hierarchy can be ranked based on the normalized scores of the users. The ranking can be presented via a graphical user interface to an administrator that requests the ranking. The administrator can subsequently use the ranking to identify users that need assistance and coaching in communication in completing tasks.

Cloud Server

FIG. 1 is a block diagram illustrating a network configuration according to one embodiment of the invention. Referring to FIG. 1, system 100 includes, but is not limited to, one or more client systems 101-102 communicatively coupled to servers 105-107 and an AI-driven cloud server 111 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless.

Servers 105-107 can be any kinds of servers or a cluster of servers, such as, for example, Web servers, application servers, cloud servers, backend servers, etc. Task database server 105 provides task data services and data to a variety of clients, which may be periodically or constantly accessed and updated by the clients for managing their task management data. In one embodiment, the task database system can be a CRM system.

In an embodiment, the cloud platform server 111 can be provided between client devices 101-102 and the task database system 105. Users at client devices 101-102 can log in to the cloud server 111, which can utilize services and data provided by the task database server 105. As such, the cloud server 111 operates to add a layer of intelligence to the task database system 105.

In an embodiment, the cloud server 111 provides a number of predictive algorithms based on AI and machine learning technologies, for use in identifying risks and delivering predictive insights using data gathered from a number of sources. For example, the cloud server 111 can provide users with insights into which tasks are most likely to complete and which tasks are at the highest risk of slipping, to enable the users to focus their resources on the right tasks. The cloud server 111 can provide the above-mentioned insights by analyzing all tasks over a predetermined period of time in the past, e.g., over the past two years, and use a model (e.g., hidden Markov model) and one or more AI classification algorithms to identify patterns and factors that drive those tasks that were successfully completed and those tasks that failed to complete.

The cloud server 111 can perform a number of additional functions using modules executing in the cloud server 1111. As shown in FIG. 1, the cloud server 111 can include a number of modules, for example, database management module 112, task management module 113, analytics module 117, user grouping and classifying module 121, pipeline coverage module 123, and task completion estimating module 125. Each of the modules can execute on a separate hardware server, a separate virtual machine, or a separate software application server instance. Alternatively, the modules can execute on the same hardware server, the virtual machine or the software application server instance. The modules are provided for illustration purposes. Additional modules and additional functionality for each module can be added without limitation.

In an embodiment, database management module 112 provides task management to clients 101-102 based on task data provided by the task database system 105 as a data source. The database management module 112 can provide one or more services that can be used to initiate or schedule processing threads to synchronize data between activity database system 106 and the task database system 105. Database management module 112 can retrieve activity data from the activity database server 106, perform an analysis on the activity data, and update task data of the task database system 105 based on the analysis of the activity data.

In an embodiment, the synchronization between the task database system 105 and the activity database server 106 can be performed automatically and periodically using multiple processing threads. Through a first processing thread executed by a processor, the database management module 112 can access the activity database server 106 via an application programming interface (API) over a network, to retrieve a list of event objects that are associated with a number of activities in the activity database 106.

In an embodiment, through a second processing thread, the database management module 112 can determine one or more participant identifiers (IDs) from each of the event objects. The participant IDs identify one or more participants in an event or activity associated with the event object.

The database management module 112 can extract a domain ID from each participant ID. Alternatively, the database management module 112 can obtain the domain ID for each participant by searching a data structure or database, or through a third party such as domain registry server 107. The database management module 112 can identify one or more entity objects based on the domain ID, where the entity objects are stored in the task database server 106.

In an embodiment, at least one attribute of at least one of the entity objects is modified based on the participant ID and the domain ID. The modification can generate at least one modified entity object. The database management module 112 can use a third processing thread to transmit one or more modified event objects to the task database server 105 via a second API over the network. The first processing thread, the second processing thread, and the third processing thread can be executed independently.

In one embodiment, in modifying the at least one attribute of the at least one entity object, the database management module 112 can determine whether there are multiple entity objects associated with the same domain ID. If there are, the database management module 112 can select a first entity object from the multiple entity objects based on a set of rules, and modify one or more attributes of the selected entity object based on the participant ID and the domain ID.

In a particular embodiment, if the database management module 112 determines that a participant ID matches a creator ID or owner ID corresponding to a creator or owner of any of the entity objects, the database management module 112 can select the first entity object for modification if the first entity object is the only entity object whose creator ID matches the participant ID. Otherwise, if the first entity object is not the only matching entity object, the database management module can designate the multiple entity objects as entity object candidates.

In addition, for each of the entity objects, the database management module 112 can determine whether one or more task objects are associated with the entity object. Each task object is associated with a task to be completed within a predetermined period of time. For each of the task objects, the database management module 112 can determine whether a participant ID matches a user ID of any user of a user group associated with the task object. If so, at least one attribute of the task object is modified based on the participant ID.

Referring to FIG. 1, the task management module 113 can be used to identify activities of a task associated with one of clients 101-102. The task database system 105 can be queried to obtain a task associated with an entity (e.g., a user, a group of users, a client). A first list of one or more contacts (e.g., contact persons, referred to herein target contacts) associated with the task from the task database system can be identified. For each of the contacts in the first list, a domain name can be determined based on contact information of the contact (e.g., emails, Web addresses, name of an account associated with the contacts). A first set of email addresses, referred to as target email addresses, can be determined based on the domain name and contacts using a set of activity identification rules. The activity database server 106 can subsequently be queried to retrieve a list of one or more emails and/or calendar events based on the first set of email addresses.

Analytics module 117 can include a forecast engine used to predict completion of tasks that are scheduled to be completed within a particular time period. The prediction can be based on historical task completion data of one or more past time periods and can be made using machine learning techniques. The forecast engine can first compute historical completion rates of the tasks performed during a past time period (e.g., end of quarter to the same relative day as the current date in the quarter) using a number of relevant attributes of the tasks. The forecast engine intelligently smoothens and selects the completion rates to be applied to the current time period, such that the projection is more accurate.

In one embodiment, a request can be received from a client for determining a task completion rate of a first set of tasks associated with a set of attributes. The first set of tasks has been scheduled to be performed during a first time period (e.g., a current time period). In response to the request, for each of the attributes, a completion rate of one or more of a second set of tasks corresponding to the attribute is calculated. The second set of tasks has been performed during a second time period in the past. The completion rate represents a percentage of the second set of tasks that have been completed during the second time period. An isotonic regression operation can be performed on the completion rates associated with the attributes of the second set of tasks to calibrate the completion rates. The completion rates for the attributes of the first set of tasks can be predicted based on the calibrated completion rates of the second set of tasks.

In an embodiment, user grouping and classifying module 121 can provide visibility into a task process by tracking user activities, which enables an administrator to gauge prospect engagement based on the user activities. The module can determine contacts of individual tasks, and use the contacts and their email domains to identify email interactions of a user with the contacts, and meetings between the user and the contacts. In an embodiment, the meetings can be in the past or scheduled to be held in a predetermined future time period. User grouping and classifying module 121 then computes scores for each of the users based on their activities and group and classify, or rank the users based on their scores. The scores can be used to assess performance of users, and identify users that need additional training and coaching in communicating with outside parties or client engagement.

Pipeline coverage module 123 can be used to construct a proposed pipeline needed at the beginning of a future time period, in order to hit a quota for the end of the future time period. The module can analyze patterns of open tasks at the beginning of past quarters, and can predict the composition of the proposed pipeline needed to hit the quota based on historical data.

Task completion estimating module 125 can be used to estimate the time a user has spent so far in a task and the time that will be required of the user to complete the task. The module considers the time that the user has spent on digital interactions associated with the task, including emails, calendar and call log activity. The digital interactions can be compared to digital interactions of past tasks that are in a similar stage.

User Activity Retrieval

As used herein, a user is a person who is responsible for completing a task in the task database system 105. User activity can be emails exchanged between a user of a task and one or more contacts (outside parties) associated with the task; and past meetings and scheduled meetings between the user and the one or more contacts. As described above, task management module 113 can be used to identify and retrieve user activities associated with a task.

Figure 2A:
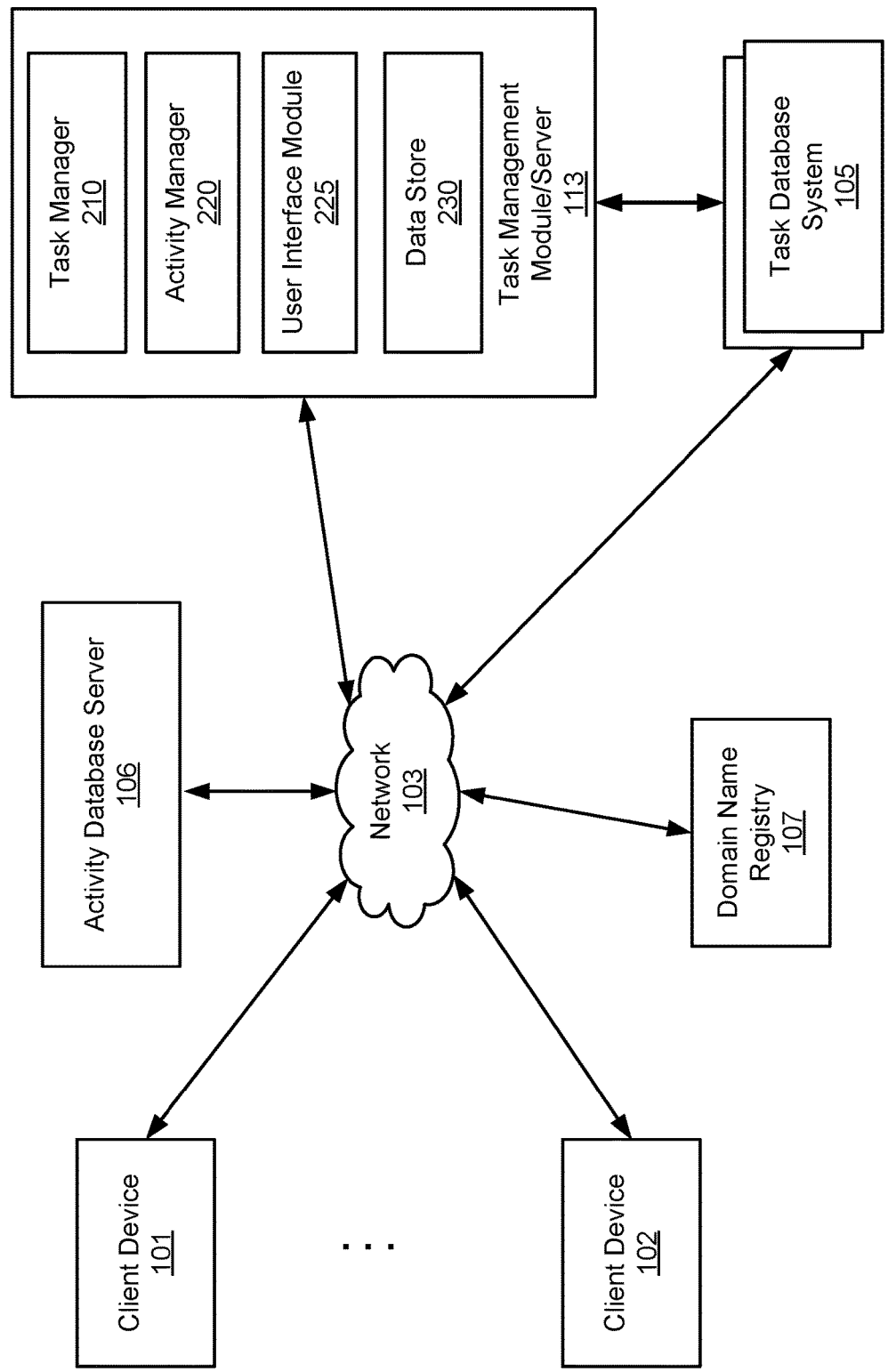
FIGS. 2A and 2B further illustrate the task management module 113 described in FIG. 1, in accordance with an embodiment of the invention.

FIG. 2A further illustrates the task management module 113 described in FIG. 1, in accordance with an embodiment of the invention. In an embodiment, the task management module/server 113 in system 200 can provides task management and/or data analytics services to clients 101-102 by utilizing data and services provided by the task database system 105 as a data source. Although there is only one task database system shown in FIG. 2A, multiple task database systems can be used to support the task management server/module 113, which can be implemented as a multi-tenancy system.

In an embodiment, the multi-tenancy system can access multiple task database systems concurrently over network 103. For example, a user of client device 101 may be associated with a first organization as a first corporate client to the task management server/module 113, while a user of client device 102 may be associated with a second organization as a second corporate client to the task management server/module 113. The first and second organizations may employ different ones of the multiple task database systems.

In one embodiment, the task management server/module 113 includes, but is not limited to, a task manager 210, activity manager 220, user interface module 225, and data store 230. The task manager 210 is configured to interact with the task database system 105 to access and manage tasks hosted by the task database system 105. Activity manager 220 is configured to determine any activities associated with a particular task, such as emails and calendar events (e.g., meetings). The user interface module 225 provides a user interface, which can be any kind of user interface (e.g., Web, graphical user interface or GUI, or command line interface or CLI) that allows users of client devices 101-102 to access services provided by the task management server/module 113.

In one embodiment, the services can include automatically identifying activities associated with a task. The identified activities can be presented by the user interface module 225 on a graphical user interface (GUI) at a client that accesses the task management system 113.

Data store 230 stores or caches data of a variety of tasks. The data may be periodically updated from a number of corresponding data source(s) or data provider(s). The task manager 210 and/or activity manager 220 may directly access the task database system 105 to query and retrieve the data. Data stored in the data store 230 can be maintained in a variety of data structures, such as tables or databases. The task manager 210 and/or activity manager 220 can access data store 230 via a variety of application programming interfaces (APIs), database queries, or other suitable communication protocols (e.g., structured query language or SQL).

According to one embodiment, activity manager 220 is configured to identify activities of a task associated with a client by invoking the task manager 210, which communicates with the task database system 105 to determine target email addresses of the client, e.g., a prospect or customer. The activity manager 220 also determines source email addresses of users associated with the task. For the source email addresses and target email addresses, the activity manager 220 can automatically query the activity database server 106 to determine email and meeting activities associated with the task. The activity manager 220 can automatically populate these activities accurately as soon as meetings have been scheduled and/or emails have been exchanged at the activity database server 106.

Figure 2B:
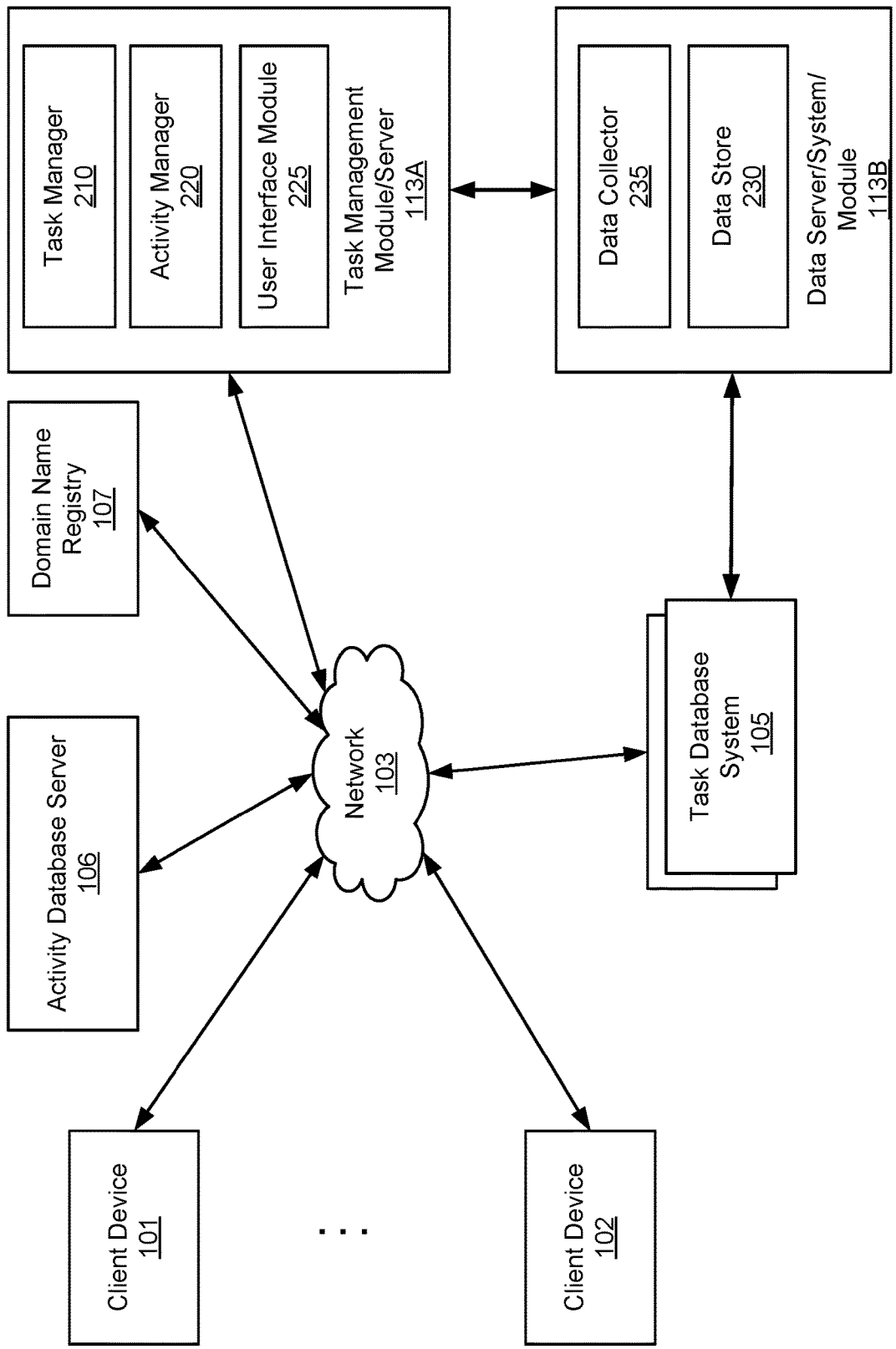

Although in this embodiment, data store 230 is maintained by the task management system 113, data store 230 can be maintained in a dedicated data server that is a separate server from the task management server/module 113 as shown in FIG. 2B.

Referring now to FIG. 2B, in this embodiment, task management server 113A and data server 113B are implemented as separate servers, which may be operated by the same or different organizations or entities. Data store 230 in this embodiment is maintained by data server 113B, which further includes data collector 235 that is configured to periodically or constantly collect or update data from the task database system 105. The task management server 113A communicates with data server 113B using a variety of communication protocols to access task data stored in data store 230.

Figure 3:
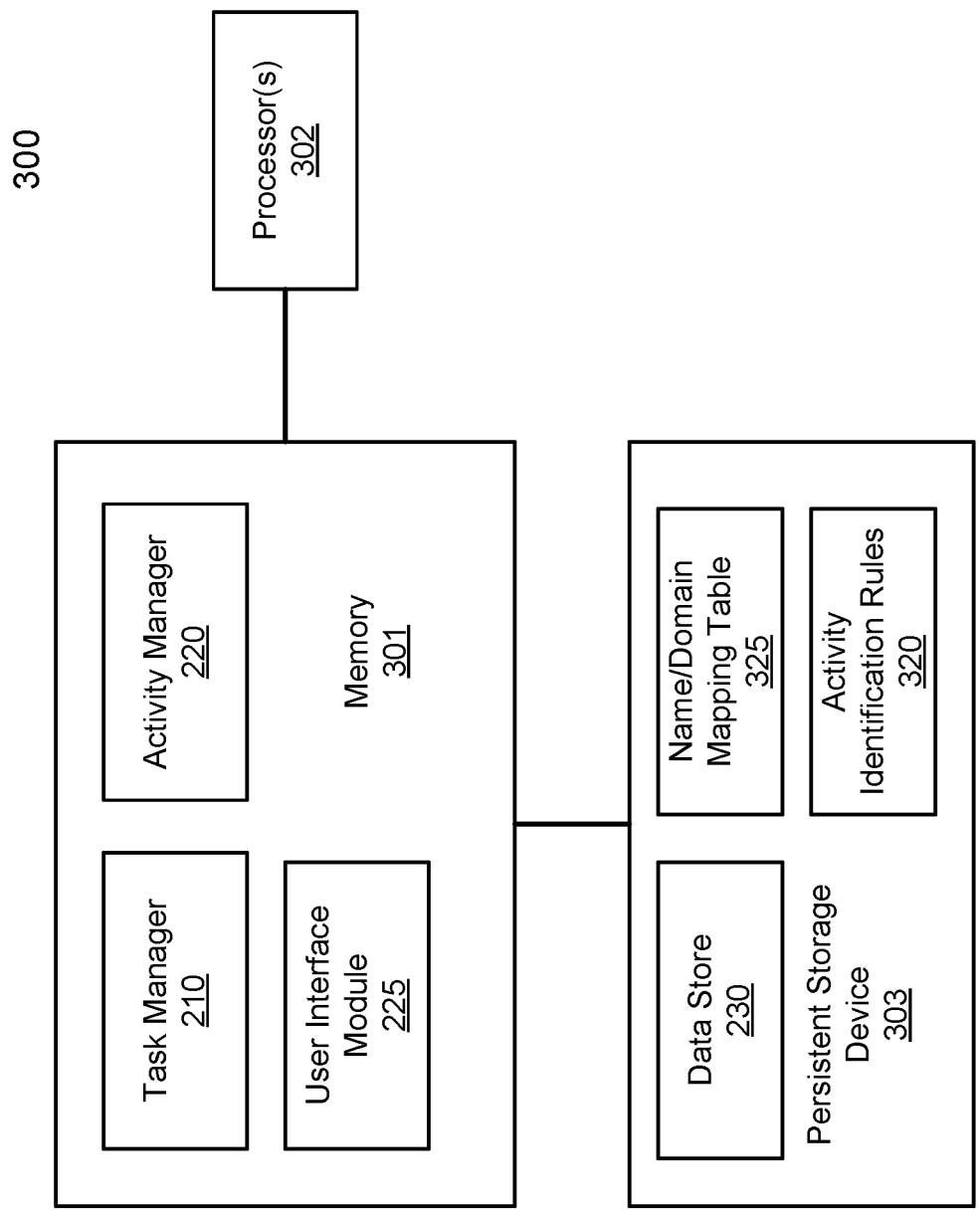
FIG. 3 is a block diagram illustrating an example of a task management system according to one embodiment of the invention.

FIG. 3 is a block diagram illustrating an example of a task management system according to one embodiment of the invention. System 300 may be implemented as part of a task management system or server 113. Referring to FIG. 3, system 300 includes a task manager 210, an activity manager 220, and a user interface module 225 loaded in memory 301 (e.g., volatile memory such as random access memory or RAM) and executed by one or more processors 302 (e.g., microprocessors, central processing units or CPUs). Data store 230 is maintained in persistent storage device 303, such as a hard disk, which may be maintained locally or remotely over a network. At least a portion of data stored in data store 230 may be cached in memory 301.

Referring now to FIGS. 2A-2B and 3, according to one aspect of the invention, the task manager 210 queries the task database system 105 to obtain a list of tasks that are associated with a particular entity (e.g., a user, a group of users, a client or customer). The task database system 105 can be associated with or utilized by an Enterprise client that a user works with as a customer representative or sales representative.

For example, a team manager of a sales team having one or more team members can log into the task management system 300, and in response to the login, the task manager 210 can communicate with the task database system 105 to retrieve a list of tasks that the one or more team members are to work on.

In one embodiment, when the task manager 210 queries the task database system 105, the task manager 210 can send a query request to the task database system 105. The query request can include a number of parameters that specify one or more attributes of the tasks to be queried and retrieved. In response to the query request, the task database system 105 operates to return the list of tasks.

For example, the task manager 210 can query the task database system 105 by specifying that only account contacts of a particular account should be retrieved or only contacts of a particular task should be retrieved. Alternatively, the task manager 210 may perform filtering of accounts and/or tasks to identify the tasks.

Figure 4:
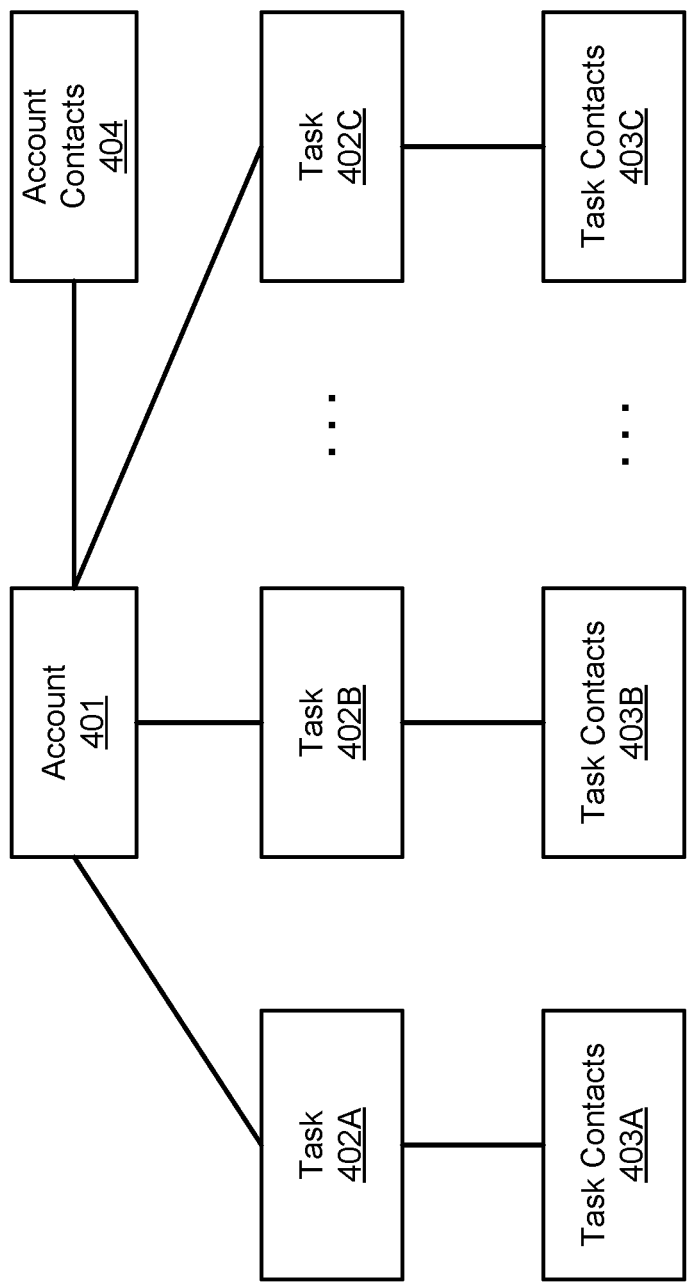
FIG. 4 illustrates an exemplary account in accordance with an embodiment of the invention.

FIG. 4 illustrates an exemplary account in accordance with an embodiment of the invention. As shown in FIG. 4, account 401 may be associated with one or more tasks 402A-402C. For example, account 401 may belong to a client or customer that has potential tasks 402A-402C that are being concurrently processed. Account 401 may be managed by one or more persons at an account level, referred to as account contacts 404. Each of the tasks 402A-402C may be managed by one or more persons at a task level, referred to herein as tasks contacts, such as task contacts 403A-403C. Different people may be associated with account contacts 404 and task contacts 403A-403C. Alternatively, a single person can be a part of both account contacts 404 and any one or more of task contacts 403A-403C. Each of account contacts 404 and task contacts 403A-403C may include one or more email addresses of the contact (e.g., a source email address and/or a target email address) and/or a Web site associated with the account or task. These contact information may be stored in the task database system 105 and can be accessible via queries.

For each of the tasks (e.g., tasks 402A-402C of FIG. 4), referring back to FIGS. 2A-2B and 3, the task manager 210 can query the task database system 105 to obtain a first list of one or more contacts (e.g., contact objects) associated with the task (e.g., task object), which can be a target contact or a source contact. A target contact refers to a person of a client or customer as a point of contact for a particular task. A source contact refers to a person that is responsible for the task within a sales organization. An example source contact is a sales representative that works on a task. For the contacts in the first list, activity manager 220 can determine a domain name based on contact information of the contacts (e.g., emails, Web addresses, name of an account associated with the contacts). A first set of email addresses, referred to as target email addresses, are determined based on the domain name and contacts using a set of activity identification rules 320. A target email address refers to an email address associated with a target contact. An email server is queried to retrieve a list of one or more emails and/or calendar events based on the first set of email addresses.

In one embodiment, if the contact information of a task includes the email addresses of the contacts, the email addresses may be directly used in identifying the activities. The domain name can be extracted from the email addresses, and used to identify other email addresses of the contacts. However, in some situation, the contact information stored in the task database system may not include an email address of the contact. In such a scenario, the domain name can be derived from other information (e.g., name, notes, Web address, phone number, social network such as Facebook®, Twitter®, LinkedIn®, etc.) associated with the contact.

The activity identification rules 320 may specify a preference or priority order indicating which of the contact information should be used in order to identify a domain name. For example, activity identification rules 320 may specify that a task contact should be used to determine a domain name over the account contact, and that the account contact will be used only if the task contact is unavailable.

In an embodiment, the activity identification rules 320 may be different for different clients, different accounts, and/or different tasks; and can include a first set of rules for identifying source email addresses and a second set of rules for identifying target email addresses. Further, the email identifying rules 320 may be configurable by an administrator via a configuration interface such as a CLI or Web interface.

In one embodiment, in determining a domain name associated with a client, an account, or a task, the activity manager 220 can determine whether there is any task contact associated with the task. If there is a task contact associated with the task, the activity manager 220 can determine the domain name based on the task contact of the task. A task contact refers to a person of a client who specifically handles a particular task. The domain name may be derived from any contact information (e.g., name, notes, Web address, phone number, social network such as Facebook®, Twitter®, LinkedIn®, etc.) associated with the task contact. If there is no task contact associated with the task, the activity manager 220 determines the domain name based on an account contact associated with an account to which the task belongs. The domain name may be obtained from an email address or other information of the account contact. In this example, activity identification rules 320 associated with this task may specify that a task contact should be utilized over an account contact in determining a domain name.

According to another embodiment, if there is no account contact associated with the account of the task, dependent upon activity identification rules 320, the activity manager 220 may determine the domain name based on a Web address of a Web site associated with the account. The Web address may also be obtained from the task database system 105 as a part of account contact information of the account associated with the task.

According to one embodiment, if there is no Web address obtained from the task database system 105, the activity manager 220 determines the domain name from a domain name registry, such as domain name registry 107, based on an account name of the account. Typically, if the account has been registered in the domain name registry (e.g., WHOIS™), the registered domain name is typically registered under a particular name. Based on the account name, a registered domain name may be obtained from domain name registry 107.

If there is no registered domain name based on the account name, the activity manager 220 utilizes a name-to-domain (name/domain) mapping table 325 to obtain the domain name based on the account name. In one embodiment, name/domain mapping table 325 includes a number of mapping entries, where each mapping entry maps a particular name to a domain name. Name/domain mapping table 325 may be maintained and updated over time to map a name to a domain name, especially when a name is not related to a domain name from its appearance.

The above process is to determine a domain name associated with a client (e.g., customer), an account, and/or a task. The domain name is then utilized to determine email addresses for the purpose of identifying activities of a task. Some of the above operations or the sequential order of the operations may be different dependent upon the specific situations, which may be specified as part of the activity identification rules associated with the client, the account, and the task.

According to another embodiment, in addition to obtaining the first set of email address as target email addresses, the activity manager 220 determines a second list of one or more contacts associated with the task via the task manager 210 from the task database system. The second list of contacts, referred to herein as source contacts, is associated with one or more team members of a sales team that work with one or more target contacts on the task. A source contact can be an owner of the task, a customer representative, and/or an account representative. A second set of email addresses associated with the contacts of the second list is determined by activity manager 220, where the email addresses of the second list are referred to as source email addresses. The email server, such as activity database server 106, is queried based on the source email addresses and the target email addresses to obtain a list emails and/or calendar events.

In one embodiment, only the emails or meetings that have been exchanged between the source email addresses and the target email addresses (e.g., senders and recipients) associated with the same task are identified. In some situations, a source contact may be handling multiple tasks of different accounts and/or different clients. Similarly, a target contact may handle multiple tasks of an account or multiple accounts. By matching the exact source email addresses and target email addresses, the truly relevant emails between the source contact(s) and target contact(s) of the same task may be identified.

In one embodiment, if some emails exchanged are prior to the creation of the task, such emails can be removed from the list because they are unlikely related to the task. Similarly, if certain calendar events were concluded or completed prior to the creation of the task, such calendar events may be removed. In addition, some of the contacts may be related to a broker or a product reseller or distributor, such contacts are not a part of the client or the sales team. Such contact information would not be utilized in determining the domain name for the purpose of identifying emails and calendar events of the task.

In one embodiment, if a particular contact is associated with more than a predetermined number of accounts (e.g., five accounts), such a contact is deemed to be a broker or reseller/distributor and is deemed not to be a proper target contact. Similarly, if some of the tasks have been closed, those tasks can be removed and the activities of the closed tasks would not be processed.

Grouping and Classifying Users Based on User Activity

Figure 5:
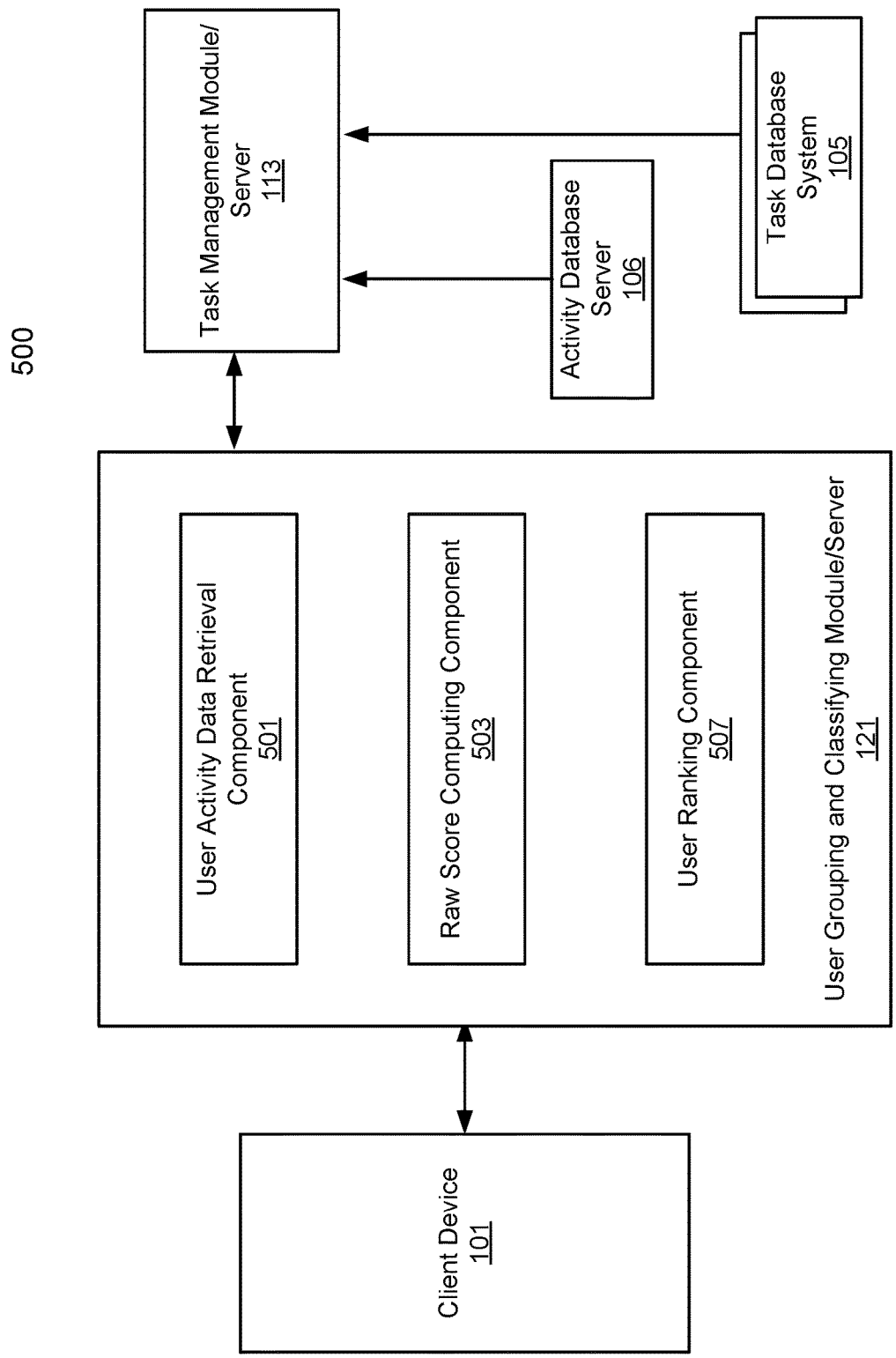
FIG. 5 further illustrates the user grouping and classifying module in accordance with an embodiment of the invention.

FIG. 5 further illustrates the user grouping and classifying module in accordance with an embodiment of the invention. In an embodiment, as described above, the user grouping and classifying module 121 can be implemented and executed as a separate server in a cloud environment, and can include a plurality of components 501-507, each of which can perform one or more functions in grouping and classifying users based on their activities.

In an embodiment, user activity data retrieval component 501 can include one or more application programming interfaces (APIs) to interface with the task management server 113. The one or more APIs provided by the user activity data retrieval component 501 can be invoked by a request for ranking users of the task database system from an administrator (e.g., a supervisor) at the client device 101, and can further invoke one or more APIs provided by the task management module/server 113 to retrieve task data and user activity data respectively from the task database system 105 and the activity database server 106.

In an embodiment, the users to be ranked can be under a particular level in a pre-defined user hierarchy. For example, the users can be sales representatives supervised by a sales manager, which can act as the administrator described above. For example, the manager may need to identify sale representatives that do not perform as expected. The manager can send a request via a user interface at the client device 101 to rank the sales representatives based on their activity in one or more predetermined time periods.

In an embodiment, the task data can include a number of tasks retrieved by the task management module 113 from the task database system 105, where each task is associated with the particular level in the pre-defined user hierarchy and is targeted to complete in the one or more predetermined time periods/frames In an embodiment, for each task, the user activity data retrieval component 501 can identify a user and a target date of completion associated with the task, and can invoke a first API on the task management module/server 113 to retrieve data associated with the user and the target date of completion from the task database system.

The user activity data retrieval component 501 can further invoke a second API provided by the task management module/server 113 to retrieve, using a mail protocol, activity data of the user associated with the task from the activity data serve. The activity data can include email communication and meetings between the user and one or more target contacts for the task.

As further shown by FIG. 5, raw score computing component 503 can be used to compute a raw score for the task based on the activity data representing user activities of the user. User activities in different time frames carry different weight in computing the raw score. Each weight can be a number between 0 and 1, and can be derived from historical data or arbitrarily determined by an administrator. In an embodiment, weight values for the user activities in different time frames/periods for use in computing a raw score for a task can be dynamically changed via a user interface by the administrator.

In an embodiment, the raw score computing components 503 can identify one or more tasks associated with a particular user, and sum up total raw scores of the one or more tasks to obtain a total raw score of the particular user. The total raw can be normalized at an organization level (i.e., the top level of the pre-determined user hierarchy).

In an alternative embodiment, the raw score computing component 503 can normalize the raw score for each of the plurality of tasks at the particular level in the user hierarchy using a predetermined normalization algorithm. For example, the predetermined normalization algorithm can be based on standardization or z-scores, which enables raw scores for different tasks at the particular level in the user hierarchy to be comparable with each other. By using z-scores, the pre-determined normalization algorithm can take into account differences in raw scores that are attributable to attributes/characteristics of tasks assigned to different users.

User ranking component 507 can generate a ranking of the users under the particular level in the user hierarchy based on the normalized total raw scores of the users and transmit the ranking of the user to a remote device over the network to be displayed in a graphical user interface of the remote device.

FIG. 6 illustrates an example of computing raw score for a particular task in accordance with an embodiment of the invention. As shown in FIG. 6, a number of emails sent in the last 4 weeks and in the last three months 613 are retrieved from an activity database server. Similarly, a number of emails received in the last 4 weeks and in the last 3 months are retrieved from the activity database server.

As further shown, a number of meetings in the last 4 weeks and in the last three months as well as a number of scheduled meetings 617 are also retrieved from the activity database server. In an embodiment, when calculating the raw score for the task, only meetings scheduled for a predetermined time period are used.

For each of the user activity described above, a corresponding weight can be used 615, 619. Each weight can be arbitrarily determined based on past experiences of an administrator or based on historical data. In an embodiment, the raw score R for the task can be computed by obtaining a product of each number of user activity and its corresponding weight, and then summing up the products 621.

Figure 7:
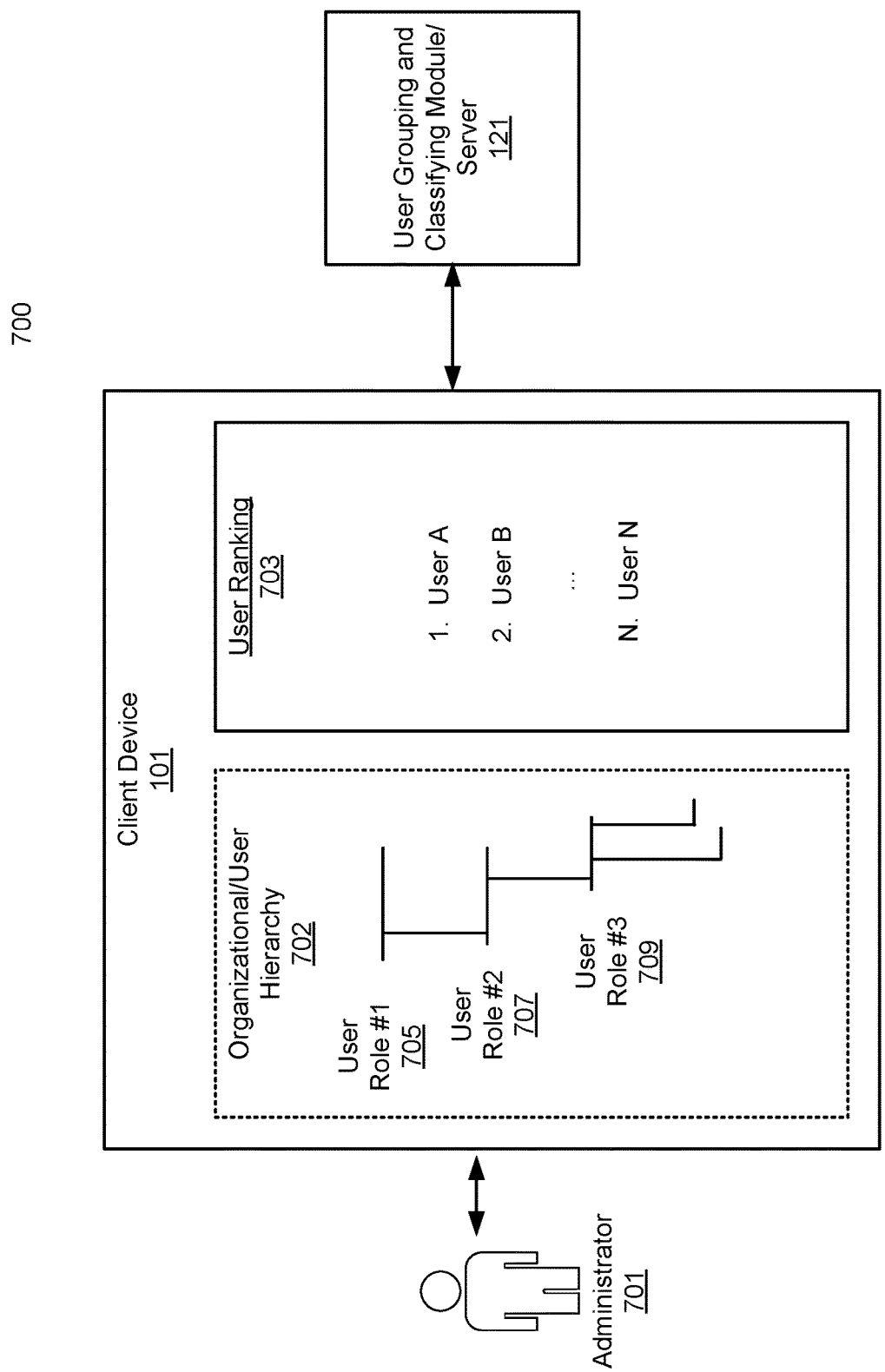
FIG. 7 illustrates a graphic user interface at a client device in accordance with an embodiment of the invention.

FIG. 7 illustrates a graphic user interface at a client device in accordance with an embodiment of the invention. As shown in FIG. 7, an administrator 701 can request a ranking of users at the client device 101, which can display a graphical user interface showing an organizational/user hierarchy 702. In an embodiment, the user hierarchy 702 can include a plurality of user roles organized in an hierarchy, for example, user role #1 705, user role #2 707, and user role #3 709. Each user role can be at a different level in the organization/user hierarchy. For example, user role #705 can be a sales VP, user role #707 can be a sales director, and user role #3 709 can be a sales manager.

The administrator can select a user role on the organizational/user hierarchy 702, so that only users under the selected user role are to be ranked by the user grouping and classifying module/Server 121. Each user role on the organizational/user hierarchy 702 can manage a number of users and can represent a particular level in the organizational/user hierarchy 702.

As further shown in FIG. 7, a user ranking interface 703 can be provided on the client device 101 to display a user ranking generated by the user grouping and classifying module/server 121 in response to the request from the administrator 701. The user ranking interface 703 in FIG. 7 shows a user ranking including user A, user B and user N, which can be users managed by a particular user role selected by the administrator 701.

Figure 8:
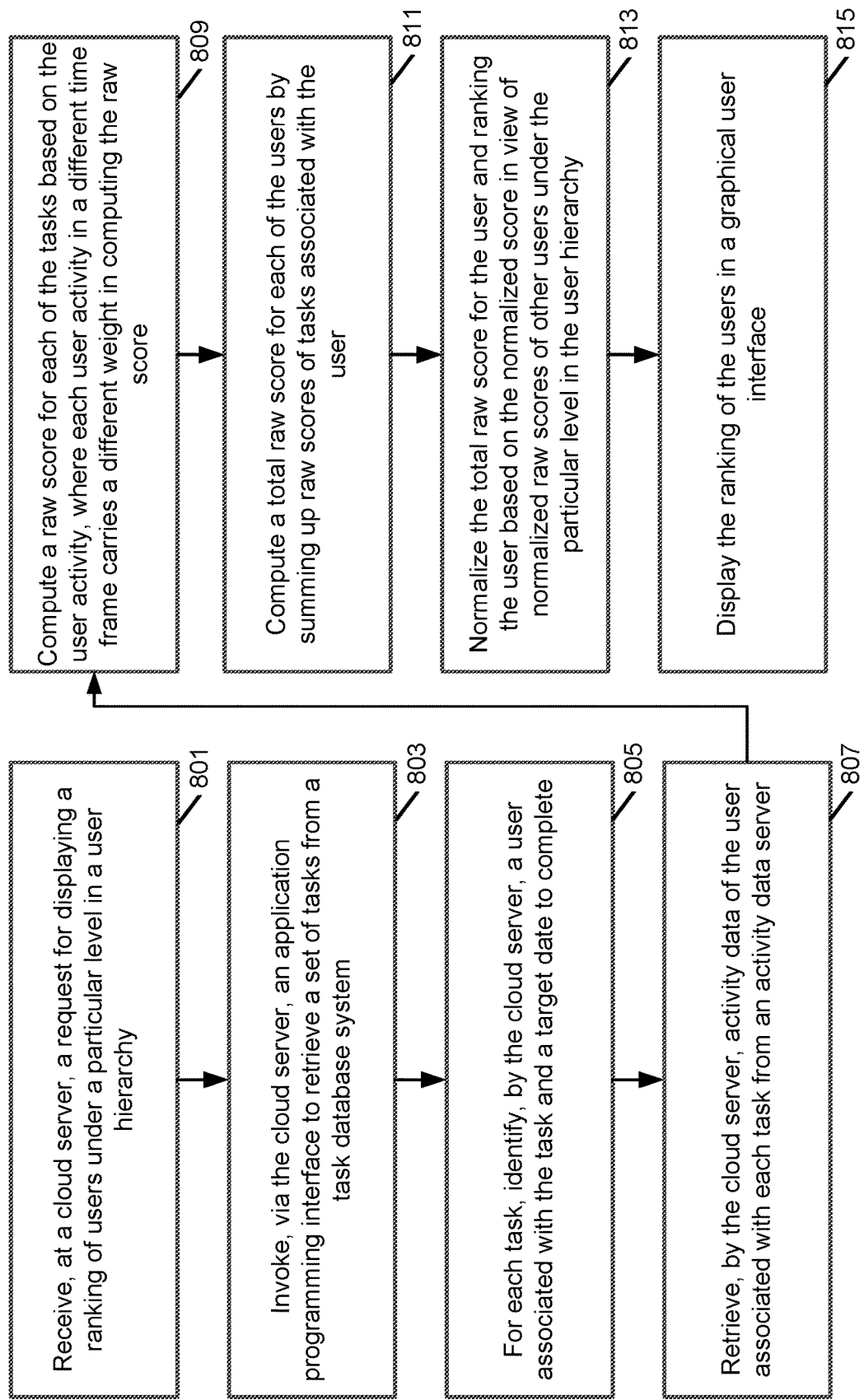
FIG. 8 illustrates a process for grouping and classifying users based on their activity in accordance with an embodiment of the invention.

FIG. 8 illustrates a process for grouping and classifying users based on their activity in accordance with an embodiment of the invention. As shown in FIG. 8, process 700 may be performed by process logic that includes software, hardware, or a combination thereof. For example, process 700 may be performed by the user grouping and classifying module/server 121 and one or more other modules in the cloud server 111.

Referring to FIG. 8, in operation 801, a cloud server having a memory and a processor over a network receives a request for ranking users of a task database system, wherein the users are under a particular level in a user hierarchy. In operation 803, the cloud server, in response to the request, retrieves via a first application programming interface (API) using a database query protocol a plurality of tasks from the task database system, wherein each of the plurality of tasks is associated with the particular level in the user hierarchy and is targeted to complete in a predetermined time frame. In operation 805, for each of the tasks, the cloud server identifies a user associated with the task and a target date to complete for the task from the task database system via the first API.

In operation 807, the cloud server retrieves via a second API using a mail protocol, activity data of the user associated with the task from an activity data server, wherein the activity data includes email communication and meetings between the user and one or more target contacts for the task. In operation 809, the cloud server computes a raw score for the task based on the activity data representing user activities of the user, wherein each user activity in a different time frame carries a different weight in computing the raw score. In operation 811, the cloud server computes a total raw score for the user by summing up raw scores of tasks associated with the user. In operation 813, the cloud server normalizes the total raw score for the user using a predetermined normalization algorithm, and ranks the user based on the normalized total raw score in view of total raw scores of other users under the particular level in the user hierarchy. In operation 815, the cloud server transmits the ranking of the user to a remote device over the network to be displayed in a graphical user interface of the remote device.

Figure 9:
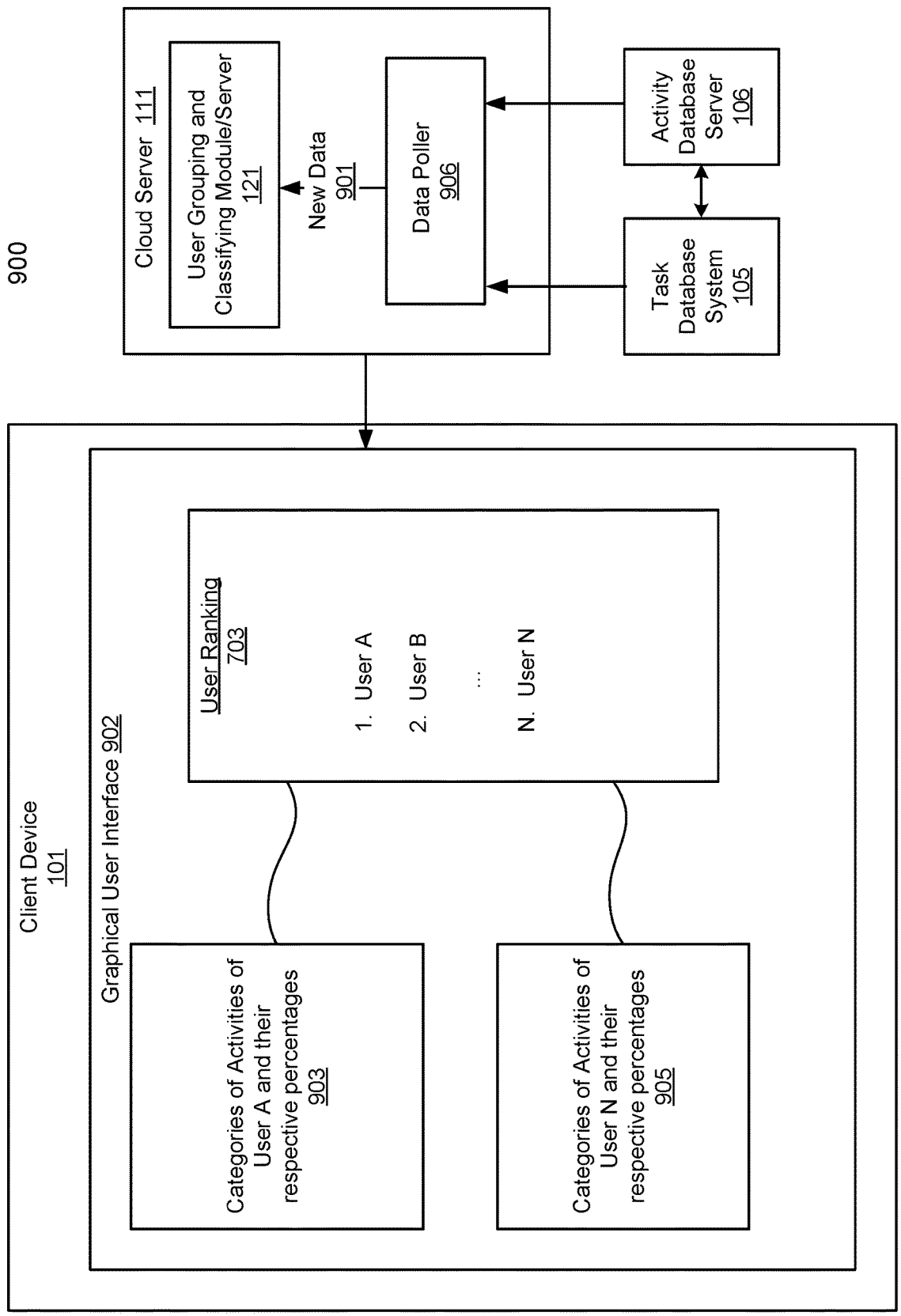
FIG. 9 illustrates a graphical user interface showing a user ranking in accordance with an embodiment of the invention.

FIG. 9 illustrates a graphical user interface showing a user ranking in accordance with an embodiment of the invention. As shown in FIG. 9, the user grouping and classifying module 121 can generate the user ranking 703 and displays the ranking in a graphical user interface 902 on the client device 101. The user cloud server 111 can include a data poller 906, which is configured to poll the task database system 105 and the activity database server 106 at a fixed interval (e.g., every 3 hours) for any new data 901, including newly completed tasks and new user activity data. The new data 901 can be used by the user grouping and classifying module 121 to generate the user ranking 703.

As the data poller 906 keeps polling new data from the task database system 105 at a configurable fixed interval, the user grouping and classifying module 121 can update the user ranking at the same interval. In an embodiment, for the user (e.g., user A) at the top of the ranking and the user (e.g., user N) at the bottom of the ranking, the user grouping and classifying module 121 can generate a view (e.g., a popup window) 903 or 905 to show categories of user activities and their respective percentages.

As such, the graphical user interface 902 can operates a real-time monitoring and visualization interface, which can provide a real-time ranking of users based on their performance, detailed information of the top performance and the bottom performance. The graphical user interface 902 also allows the supervisor to view changes in the ranking as new user activities data and task data are updated. For example, the user activities data may change due to coaching and training provided to the bottom performance of a previous ranking.

Figure 10:
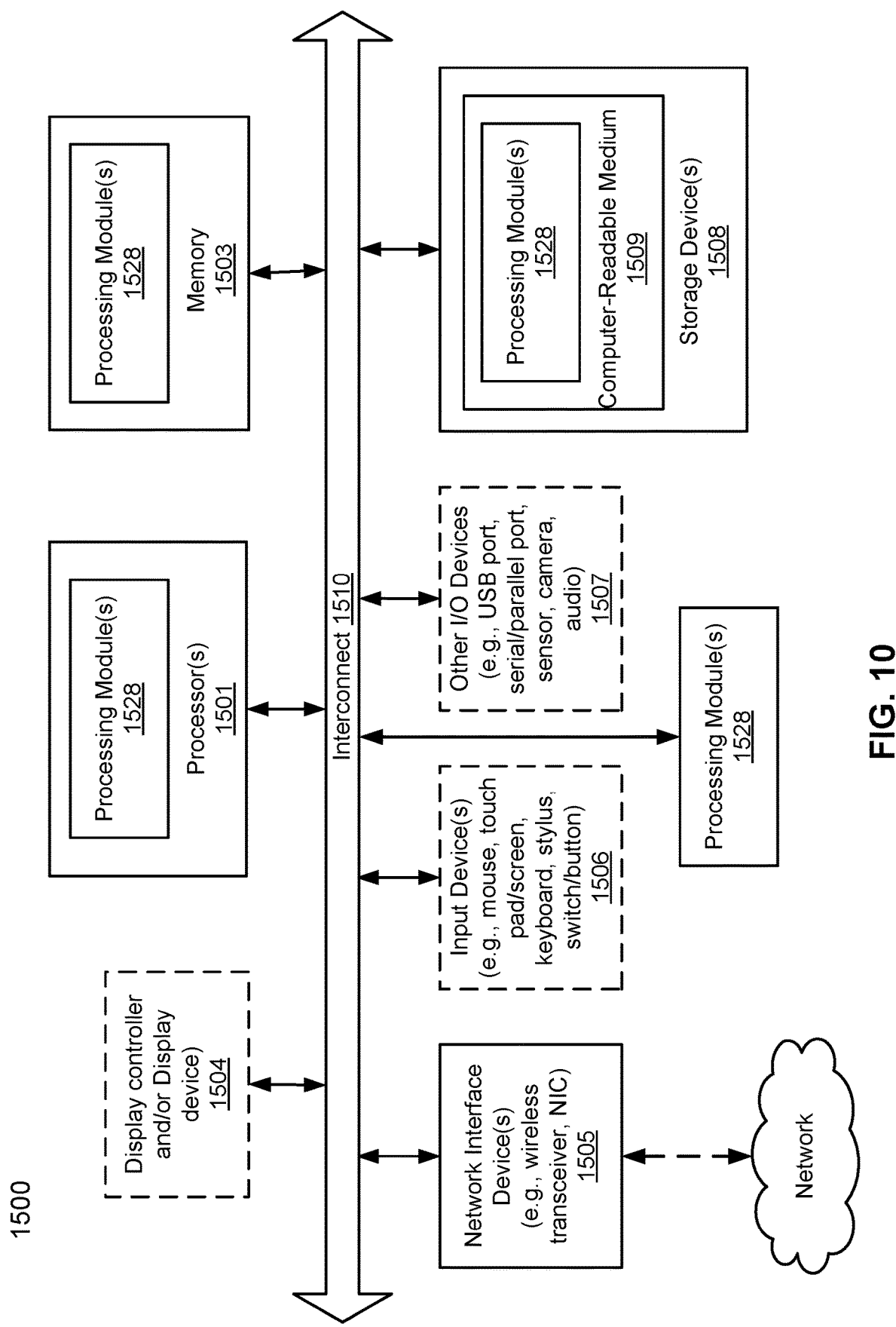
FIG. 10 is a block diagram illustrating an example of a data processing system which may be used with one or more embodiments of the invention.

FIG. 10 is a block diagram illustrating an example of a data processing system which may be used with one or more embodiments of the invention. For example, system 1500 may represent any of data processing systems described above performing any of the processes of methods described above, such as, for example, client devices 101-102 and servers 105-107 and 111 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, task manager 110, activity manager 120, and/or data synchronization module 212 of FIGS. 1A-1B and 2, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing and grouping user objects based on attributes of task objects linked with the user objects, the method comprising:
   receiving, at a first server, a first request from a first client device over a network for classifying a plurality of user objects associated with a plurality of task objects corresponding to a plurality of tasks respectively;
   in response to the first request, retrieving, using a database query protocol, a plurality of task objects representing a plurality of tasks from a second server hosting a task database system over the network, wherein each of the plurality of tasks is targeted to complete in a predetermined time frame;
   for each of the task objects,
      identifying a user object associated with the task object and a target date to complete for the corresponding task from the task database system hosted by the second server,
      retrieving, by the first server using a mail protocol, an activity data object associated with the user object and the task object from a third server operating as an activity data server over the network, wherein the activity data object includes activity data associated with the task object, the activity data including a first type of activity data in a first time frame and a second time frame, and a second type of activity data in the first time frame and the second time frame,
      computing a raw score for the task object using a weighted algorithm based on each type of activity data in each of the first time frame and the second time frame and a corresponding weight, wherein each type of activity data in each of the first time frame and the second time frame is assigned with a weight,
      computing a total raw score for the user object based on the raw scores of the task objects associated with the user object,
      normalizing the total raw score for the user object using a predetermined normalization algorithm,
      ranking the user object based on the normalized total raw score in view of normalized total raw scores of other user objects under a particular level in a user object hierarchy, and
      transmitting the ranking of the user object to the first client device over the network;
   receiving at the first server a second request from a second client device for classifying the user objects; and
   in response to the second request,
      iteratively performing retrieving a plurality of task objects, identifying a user object, retrieving an activity data object, computing a raw score, computing a total raw score, normalizing the total raw score, ranking the user object, and
      transmitting second ranking information of the user object to the second client device over the network.

2. The method of claim 1, wherein the activity data includes a number of emails sent to one or more target contacts and a number of emails received from the one or more target contacts in the first time frame and the second time frame.

3. The method of claim 1, wherein the activity data includes a number of meetings in the first time frame and a number of meetings in the second time frame.

4. The method of claim 1, wherein the activity data includes a number of upcoming meetings scheduled between a user of the user object and the one or more target contacts in the first time frame and the second time frame.

5. The method of claim 1, wherein each weight used in computing the raw score for the task object is predetermined based on historical data.

6. The method of claim 1, wherein the normalizing of the total raw scores is performed at a top level of the user object hierarchy by taking into account of all user objects in the user object hierarchy.

7. The method of claim 1, wherein the normalizing of the total raw scores is performed at the particular level of the user object hierarchy by taking into account of the user objects under the particular level in the user object hierarchy.

8. The method of claim 1, wherein the first server includes a plurality of modules configured to use data and services provided by the task database system.

9. The method of claim 1, wherein in the event of a failure of the activity data server, the first server operates to retrieve activity data of the user object from the task database system, which has been periodically and automatically synchronized with the activity data server.

10. The method of claim 1, wherein the user object hierarchy includes a plurality of levels, at least one of the levels representing a user role that manages one or more other users.

11. The method of claim 10, wherein each of the levels is selectable at a graphical user interface, and wherein the selection of a particular level causes the first server to generate a ranking of user objects under the selected level.

12. A non-transitory machine-readable storage medium having instructions stored therein, which when executed by a processor of a first server, cause the processor to perform operations, the operations comprising:
  receiving, at a first server, a first request from a first client device over a network for classifying a plurality of user objects associated with a plurality of task objects corresponding to a plurality of tasks respectively;
  in response to the first request, retrieving, using a database query protocol, a plurality of task objects representing a plurality of tasks from a second server hosting a task database system over the network, wherein each of the plurality of tasks is targeted to complete in a predetermined time frame;
  for each of the task objects,
    identifying a user object associated with the task object and a target date to complete for the corresponding task from the task database system hosted by the second server,
    retrieving, by the first server using a mail protocol, an activity data object associated with the user object and the task object from a third server operating as an activity data server over the network, wherein the activity data object includes activity data associated with the task object, the activity data including a first type of activity data in a first time frame and a second time frame, and a second type of activity data in the first time frame and the second time frame,
    computing a raw score for the task object using a weighted algorithm based on each type of activity data in each of the first time frame and the second time frame and a corresponding weight, wherein each type of activity data in each of the first time frame and the second time frame is assigned with a weight,
    computing a total raw score for the user object based on the raw scores of the task objects associated with the user object,
    normalizing the total raw score for the user object using a predetermined normalization algorithm,
    ranking the user object based on the normalized total raw score in view of normalized total raw scores of other user objects under a particular level in a user object hierarchy, and
    transmitting the ranking of the user object to the first client device over the network;
  receiving at the first server a second request from a second client device for classifying the user objects; and
  in response to the second request,
    iteratively performing retrieving a plurality of task objects, identifying a user object, retrieving an activity data object, computing a raw score, computing a total raw score, normalizing the total raw score, ranking the user object, and
    transmitting second ranking information of the user object to the second client device over the network.

13. The machine-readable storage medium of claim 12, wherein the activity data includes a number of emails sent to one or more target contacts and a number of emails received from the one or more target contacts in the first time frame and the second time frame.

14. The machine-readable storage medium of claim 12, wherein the activity data includes a number of meetings in the first time frame and a number of meetings in the second time frame.

15. The machine-readable storage medium of claim 12, wherein the activity data includes a number of upcoming meetings scheduled between a user of the user object and the one or more target contacts in the first time frame and the second time frame.

16. The machine-readable storage medium of claim 12, wherein each weight used in computing the raw score for the task object is predetermined based on historical data.

17. The machine-readable storage medium of claim 12, wherein the normalizing of the total raw scores is performed at a top level of the user object hierarchy by taking into account of all user objects in the user object hierarchy.

18. The machine-readable storage medium of claim 12, wherein the normalizing of the total raw scores is performed at the particular level of the user object hierarchy by taking into account of the user objects under the particular level in the user object hierarchy.

19. The machine-readable storage medium of claim 12, wherein the first server includes a plurality of modules configured to use data and services provided by the task database system.

20. The machine-readable storage medium of claim 12, wherein in the event of a failure of the activity data server, the first server operates to retrieve activity data of the user object from the task database system, which has been periodically and automatically synchronized with the activity data server.

21. The machine-readable storage medium of claim 12, wherein the user object hierarchy includes a plurality of levels, at least one of the levels representing a user role that manages one or more other users.

22. The machine-readable storage medium of claim 21, wherein each of the levels is selectable at a graphical user interface, and wherein the selection of a particular level causes the first server to generate a ranking of user objects under the selected level.

23. A data processing system operating as a first server, the system comprising:
  a processor; and
  a memory coupled to the processor to store instructions, which when executed by the processor, cause the processor to perform operations, the operations including
    receiving, at a first server, a first request from a first client device over a network for classifying a plurality of user objects associated with a plurality of task objects corresponding to a plurality of tasks respectively;
    in response to the first request, retrieving, using a database query protocol, a plurality of task objects representing a plurality of tasks from a second server hosting a task database system over the network, wherein each of the plurality of tasks is targeted to complete in a predetermined time frame;

for each of the task objects, identifying a user object associated with the task object and a target date to complete for the corresponding task from the task database system hosted by the second server, retrieving, by the first server using a mail protocol, an activity data object associated with the user object and the task object from a third server operating as an activity data server over the network, wherein the activity data object includes activity data associated with the task object, the activity data including a first type of activity data in a first time frame and a second time frame, and a second type of activity data in the first time frame and the second time frame, computing a raw score for the task object using a weighted algorithm based on each type of activity data in each of the first time frame and the second time frame and a corresponding weight, wherein each type of activity data in each of the first time frame and the second time frame is assigned with a weight, computing a total raw score for the user object based on the raw scores of the task objects associated with the user object, normalizing the total raw score for the user object using a predetermined normalization algorithm, ranking the user object based on the normalized total raw score in view of normalized total raw scores of other user objects under a particular level in a user object hierarchy, and transmitting the ranking of the user object to the first client device over the network;

receiving at the first server a second request from a second client device for classifying the user objects; and in response to the second request, iteratively performing retrieving a plurality of task objects, identifying a user object, retrieving an activity data object, computing a raw score, computing a total raw score, normalizing the total raw score, ranking the user object, and transmitting second ranking information of the user object to the second client device over the network.

24. The system of claim 23, wherein the activity data includes a number of emails sent to one or more target contacts and a number of emails received from the one or more target contacts in the first time frame and the second time frame.

25. The system of claim 23, wherein the activity data includes a number of meetings in the first time frame and a number of meetings in the second time frame.

* * * * *